W. R. CLARK.
Bee-Hives.
No. 133,355.
Patented Nov. 26, 1872.
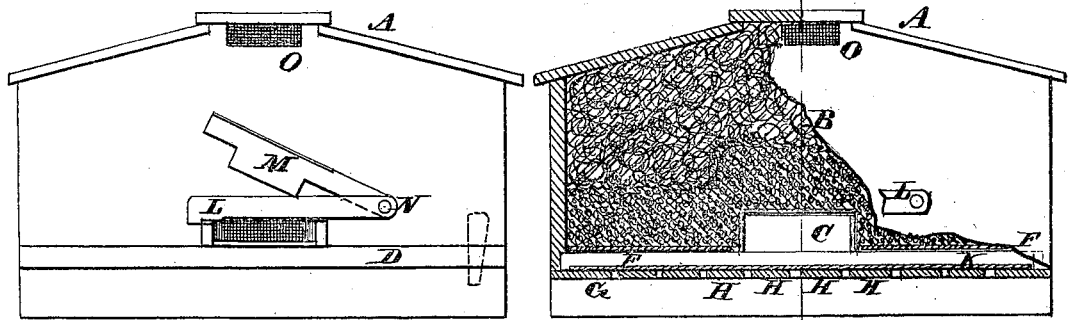
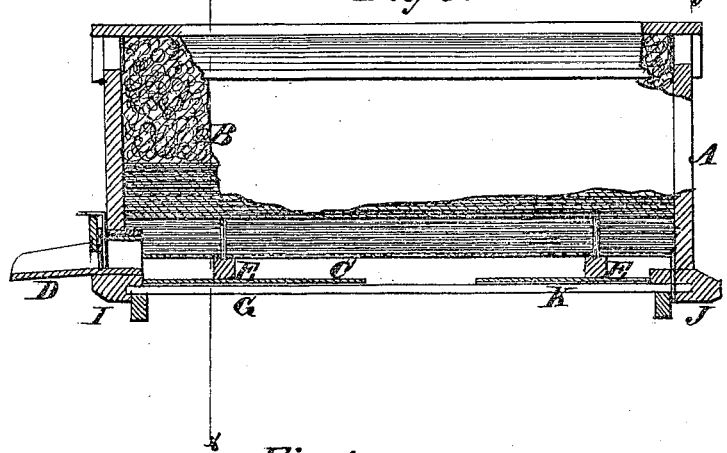
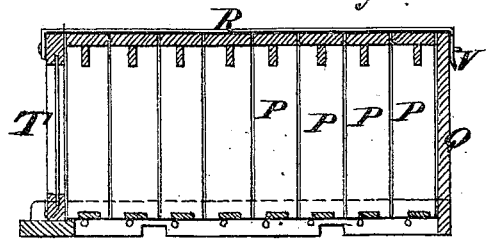
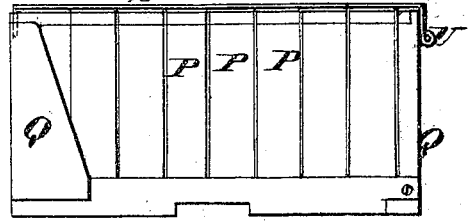
Witnesses:
John Becker
C. Sedgwick
Inventor:
W. R. Clark
per Munn & Co
Attorneys.

UNITED STATES PATENT OFFICE.

WILLIAM R. CLARK, OF PIQUA, OHIO.

IMPROVEMENT IN BEE-HIVES.

Specification forming part of Letters Patent No. 133,355, dated November 26, 1872.

*To all whom it may concern:*

Be it known that I, WILLIAM R. CLARK, of Piqua, in the county of Miami and State of Ohio, have invented a new and useful Improvement in Bee-Hives, of which the following is a specification:

The object of this invention is to provide convenient, safe, and efficient means for wintering honey-bees; and it consists in the construction of the cap of the hive and the floor or platform thereof. It also consists in the mode of securing the honey-frames together, and in other details, as will be hereinafter set forth and described.

In the accompanying drawing, Figure 1 represents a view of the front of the cap of the hive. Fig. 2 is a vertical cross-section of the cap taken on the line $x\ x$ of Fig. 3. Fig. 3 is a longitudinal section of Fig. 2 taken on the line $y\ y$, the filling of the cap in both these figures being broken away. Figs. 4 and 5 represent the manner of confining and holding the honey-frames.

Similar letters of reference indicate corresponding parts.

A is the cap, which is made to fit onto the top of the hive above the honey-frames. This cap is filled with straw, or with equivalent material, represented in the drawing by the letter B. Preferably, this filling is composed of straight straws, laid longitudinally, with pine shavings thereon. Longitudinally through the cap, beneath the filling, I form a channel or passage-way, C, which is in communication with the alighting-board D in front. The filling is kept in place by two or more cross-pieces, E, and is lined with woolen cloth or similar material F. G represents the bottom or platform of the cap, composed of slats H and clamps I and J. This platform rests upon the top of the body of the hive, and is nearly covered inside with woolen cloth K, which may be saturated with brine or other solution. The bees have free access to the passage-way or channel C, and from thence to the alighting-board D, and are thus allowed to feed in winter from one comb to another. The end clamps I and J are grooved onto the ends of the slats H, where they are fastened by dovetails and keys, or in any other suitable manner. The alighting-board D is attached to the clamp I, and may be removed therewith at any time. L is a ventilator, and M is a shutter, one or both of which may be closed down over the bee-orifice of the alighting-board, as may be desired. The ventilator and the shutter are pivoted to the front of the cap, as seen at N. O is a ventilating-orifice at the top of the cap A. The filling absorbs the moisture, and, together with the lining, the natural heat of the bees is retained. The bees have free access from the honey-frames of the hive to the channel C in the cap, and from thence onto the alighting-board. In Figs. 4 and 5 the honey-frames of the hive are shown. P represents the frames, which may be more or less in number, which are confined in a separate frame, Q, within the hive. The honey-frames are confined to the frame Q by a strap, R, or metallic hook S, as seen in those figures. T are the windows, which are hinged to the frames Q, and the hook or strap R S is attached thereto or to the frame Q, and, passing over the top of the honey-frames, they are fastened by hooking over, as seen at U, or by a pin, as seen at V.

It will be seen that the shutter M may be elevated more or less, leaving the ventilator L closing the entrance, thus enabling the ventilating air-current to be controlled, while the escape of the bees is prevented. A small current is maintained through the entrance, and up through the filling and openings O in the top, thus carrying off the moisture and relieving the brood-chamber of foul air or odors.

The mode of securing the comb-frames between the hinged sides of the frame on which they may be transported results in many advantages.

Having thus described my invention, I claim as new and desire to secure by Letters Patent—

1. In a bee-hive, a top provided with an alighting-board, a passage-way, C, and a slatted platform or bottom, G, as described, whereby the bees find access to the honey-receptacle or comb-frames from above, as set forth.

2. In a bee-hive, a top, A, provided with a filling, B, with a ventilating-aperture, O, in each end, a bee-entrance at the base, and a slatted bottom, G, in combination with a brood-chamber case for the comb-frames, whereby ventilation may be secured at the top of the brood-chamber without admission of air at the bottom.

3. The piece I, arranged to form both the alighting-board and clamp of the bottom G, as specified.

4. A series of independent and detachable comb-frames, in combination with a holding-frame provided with hinged sides, and a fastening device or clamp therefor, substantially as specified.

5. The combination of the ventilator L and shutter M, as described, whereby the latter may be adjusted to regulate the amount of air admitted to the hive without allowing escape of the bees.

WILLIAM R. CLARK.

Witnesses:
S. S. McKENNEY,
B. J. BROTHERTON.